United States Patent
Hamajima et al.

(10) Patent No.: US 9,777,105 B2
(45) Date of Patent: Oct. 3, 2017

(54) BLOCKED POLYISOCYANATE-CONTAINING CURABLE SILICONE COMPOSITION AND TEXTILE TREATMENT USING THE SAME

(71) Applicant: SHIN-ETSU CHEMICAL CO., LTD., Tokyo (JP)

(72) Inventors: Yuta Hamajima, Annaka (JP); Motohiko Hirai, Annaka (JP); Shunji Aoki, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 0 days.

(21) Appl. No.: 15/156,899

(22) Filed: May 17, 2016

(65) Prior Publication Data

US 2016/0340466 A1 Nov. 24, 2016

(30) Foreign Application Priority Data

May 18, 2015 (JP) .................. 2015-100789

(51) Int. Cl.

| | | |
|---|---|---|
| *C09D 183/08* | (2006.01) | |
| *C08G 18/83* | (2006.01) | |
| *D06M 15/564* | (2006.01) | |
| *D06M 15/643* | (2006.01) | |
| *D06M 15/647* | (2006.01) | |
| *C08L 83/08* | (2006.01) | |
| *C08G 18/61* | (2006.01) | |
| *D06M 15/653* | (2006.01) | |
| *C08G 77/26* | (2006.01) | |

(52) U.S. Cl.
CPC .......... *C08G 18/837* (2013.01); *C08G 18/61* (2013.01); *C08L 83/08* (2013.01); *C09D 183/08* (2013.01); *D06M 15/564* (2013.01); *D06M 15/647* (2013.01); *D06M 15/6436* (2013.01); *D06M 15/653* (2013.01); *C08G 77/26* (2013.01)

(58) Field of Classification Search
None
See application file for complete search history.

(56) References Cited

U.S. PATENT DOCUMENTS

| | | | | |
|---|---|---|---|---|
| 3,449,289 A * | 6/1969 | Williams | ............ | C08K 5/0025 524/266 |
| 4,413,086 A * | 11/1983 | Chang | ................ | C08G 18/61 524/386 |
| 4,680,366 A | 7/1987 | Tanaka et al. | | |
| 4,956,240 A * | 9/1990 | Williams | ............... | C08G 77/26 427/387 |
| 4,978,561 A * | 12/1990 | Cray | ..................... | A61K 8/898 252/8.63 |
| 4,988,778 A * | 1/1991 | Chang | ............... | C08G 18/6469 525/100 |
| 5,039,738 A * | 8/1991 | Czech | ................. | C08G 77/388 524/588 |
| 5,489,482 A * | 2/1996 | Minemura | .......... | C09D 183/08 428/447 |
| 5,621,043 A * | 4/1997 | Croft | ................. | C08G 18/4045 524/710 |
| 5,688,860 A * | 11/1997 | Croft | ................. | C08G 18/4054 521/122 |
| 5,718,954 A | 2/1998 | Sano et al. | | |
| 7,423,095 B2 * | 9/2008 | Gordon | ................. | C08G 18/61 106/287.11 |
| 7,759,435 B2 * | 7/2010 | Burns | ............... | C08G 18/3206 525/410 |
| 8,399,594 B2 * | 3/2013 | Horstman | ............. | C08G 18/61 525/474 |
| 2007/0059537 A1 * | 3/2007 | Hupfield | ............. | C08G 77/388 428/447 |
| 2012/0114928 A1 | 5/2012 | Jiang et al. | | |
| 2014/0109795 A1 | 4/2014 | Hirai | | |
| 2014/0342625 A1 | 11/2014 | Murray et al. | | |

FOREIGN PATENT DOCUMENTS

| | | |
|---|---|---|
| EP | 0 157 499 A1 | 10/1985 |
| EP | 0 159 120 A1 | 10/1985 |
| JP | 48-1480 | 1/1973 |
| JP | 54-43614 B2 | 12/1979 |
| JP | 57-43673 B2 | 9/1982 |
| JP | 60-185879 A | 9/1985 |
| JP | 60-185880 A | 9/1985 |
| JP | 64-1588 B2 | 1/1989 |
| JP | 64-61576 A | 3/1989 |
| JP | 7-41733 A | 2/1995 |
| JP | 7-279053 A | 10/1995 |
| JP | 3199609 B2 | 8/2001 |
| JP | 2004-059609 A | 2/2004 |
| JP | 2014-84398 A | 5/2014 |
| WO | WO 2013/085882 A1 | 6/2013 |

OTHER PUBLICATIONS

Extended European Search Report issued Sep. 5, 2016, in European Patent Application No. 16169385.8.
Japanese Offer of Information for Japanese Application No. 2015-100789, dated Jun. 20, 2017.
English translation of pertinent portions (Claims, [006] and [007]) of JP-2004-59609-A, published Feb. 26, 2004.

* cited by examiner

*Primary Examiner* — Robert S Loewe
(74) *Attorney, Agent, or Firm* — Birch, Stewart, Kolasch & Birch, LLP

(57) ABSTRACT

A blocked polyisocyanate-containing curable silicone composition includes an amino group-containing organopolysiloxane, a blocked polyisocyanate and a catalyst which is an organic base compound and/or a metal compound. The composition has a high curability even under low-temperature conditions and, when used as a textile treatment, imparts textile fibers and products with good softness and water absorbency, and also has an excellent durability to washing.

8 Claims, No Drawings

BLOCKED POLYISOCYANATE-CONTAINING CURABLE SILICONE COMPOSITION AND TEXTILE TREATMENT USING THE SAME

CROSS-REFERENCE TO RELATED APPLICATION

This non-provisional application claims priority under 35 U.S.C. §119(a) on Patent Application No. 2015-100789 filed in Japan on May 18, 2015, the entire contents of which are hereby incorporated by reference.

TECHNICAL FIELD

This invention relates to a blocked polyisocyanate-containing curable silicone composition. More specifically, the invention relates to a silicone composition having an excellent curability at low temperatures and a textile treatment composed of the composition.

BACKGROUND ART

A variety of organopolysiloxanes such as dimethylpolysiloxane, epoxy group-containing polysiloxanes and aminoalkyl group-containing polysiloxanes are widely used as treatments for imparting softness, smoothness and other desirable properties to various types of textile fibers and products. Of these, frequent use is made of aminoalkyl group-containing organopolysiloxanes, which are able to impart especially good softness to a variety of textile fibers and products. In particular, textile treatments in which the main ingredient is an organopolysiloxane having aminoalkyl groups such as —$C_3H_6NH_2$ or —$C_3H_6NHCH_2CH_2NH_2$ (JP-B S48-1480, JP-B S54-43614, JP-B S57-43673, JP-A S60-185879, JP-A S60-185880 and JP-A S64-61576) exhibit excellent softening properties and are widely used.

However, because aminoalkyl group-containing polysiloxane-based treatments are generally water-repelling, even textiles that are inherently water-absorbing exhibit hydrophobic properties following treatment. When such treatments are used on apparel, for instance, one drawback has been the substantial loss of the perspiration-absorbing action of the apparel during perspiration. This has led to studies aimed at imparting textiles with both softness and water absorbency. For example, although the water absorbency is improved by including both aminoalkyl groups and polyoxyalkylene groups in the same polysiloxane molecule, including polyoxyalkylene groups on the molecule greatly diminishes properties such as softness and smoothness. To alleviate such drawbacks, it has been proposed that the aminoalkyl groups be modified by reacting an aminoalkyl group-containing polysiloxane with a polyoxyalkylene glycidyl ether compound (JP-B S64-1588, JP No. 3199609, JP-A 2014-84398).

Also, in recent years, there has been a growing need for enhanced functionality in apparel. Hence, in the field of textile treatment, in order to impart fibers with various functions, functional finishes such as deodorizers, antimicrobial agents, disperse pigments and disperse dyes are applied onto the fibers using resin binders. For example, in JP-A H07-279053, improvements in preventing silk fibroin powder loss and in adhesion to fibers are carried out with textile treatments obtained by adding silk fibroin to a resin emulsion of polyurethane resin, polyester resin, acrylic resin or the like. JP-A H07-41733 discloses a powdered natural product-containing surface treatment which, by applying to a substrate a powdered natural product and a urea-aldehyde resin powder or the like using a synthetic resin binder such as urethane resin, acrylic resin or polyester resin, imparts qualities similar to the natural product and suppresses the generation of unpleasant odors during coating.

In order to retain for a long time these functions of softness and water absorbency possessed by the textile treatment itself, and the functions exhibited by various finishes, such as a deodorizing function and an antimicrobial function, it is necessary for the various treatments and functional finishes to continue adhering to the fibers even when washing is repeatedly carried out. Hence, the textile treatment and resin binder are required to have a high durability to washing.

CITATION LIST

Patent Document 1: JP-B S48-1480
Patent Document 2: JP-B S54-43614
Patent Document 3: JP-B 557-43673
Patent Document 4: JP-A 560-185879
Patent Document 5: JP-A S60-185880
Patent Document 6: JP-A S64-61576
Patent Document 7: JP-B S64-1588
Patent Document 8: JP No. 3199609
Patent Document 9: JP-A 2014-84398
Patent Document 10: JP-A H07-279053
Patent Document 11: JP-A H07-41733

DISCLOSURE OF INVENTION

However, the softness and wash durability that are desired in textile finishing work against each other. Specifically, when a textile treatment or binder resin having high wash durability is used in textile finishing, there tends to be a loss of softness. Another problem is that high-temperature treatment is required when applying a binder onto fibers.

It is therefore an object of this invention to provide a blocked polyisocyanate-containing curable silicone composition which has a high curability even under low-temperature treatment conditions and which, as a textile treatment, can impart textile fibers and products with a good softness and water absorbency and moreover has also an excellent durability to washing. A further object is to provide a textile treatment that uses this composition.

The inventors have conducted extensive investigations, as a result of which they have discovered that silicone compositions containing an organopolysiloxane having groups of general formula (1), a blocked polyisocyanate and a catalyst exhibit an excellent curability even at low temperatures. The inventors have also found that such compositions, when used in textile treatments, can impart textile fibers and products with a good softness and water absorbency, and moreover exhibit a high durability to washing.

Accordingly, in one aspect, the invention provides a blocked polyisocyanate-containing curable silicone composition which includes:

(A) 70 to 98 parts by weight of an organopolysiloxane having a terminal or pendant group of general formula (1) below

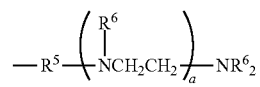

(1)

wherein $R^5$ is a divalent hydrocarbon group of 1 to 8 carbon atoms, the letter "a" is an integer from 0 to 4, and each $R^6$ is independently a hydrogen atom, a monovalent hydrocarbon group or acyl group of 1 to 10 carbon atoms, or a polyoxyalkylene-containing organic group of the formula

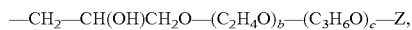

wherein Z is a hydrogen atom, a substituted or unsubstituted monovalent hydrocarbon group or acyl group of 1 to 20 carbon atoms, b is an integer from 2 to 30, c is an integer from 0 to 20, and the oxyethylene units and oxypropylene units may form a block polymer or may form a random polymer;

(B) 2 to 30 parts by weight of a blocked polyisocyanate which has at least two isocyanate groups per molecule, at least 50 mol % of the isocyanate groups being blocked with a thermally labile blocking agent, with the proviso that the combined amount of components (A) and (B) is 100 parts by weight; and (C) 0.01 to 10 parts by weight of a catalyst which is an organic base compound and/or a metal compound.

In a preferred embodiment, component (A) is at least one of the organopolysiloxanes of general formulas (2) to (4) below.

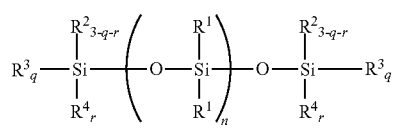

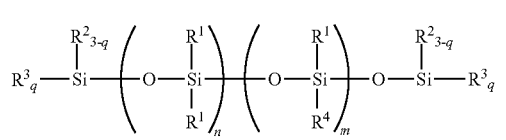

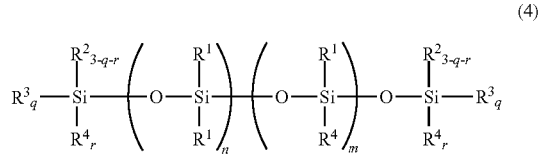

Here, $R^4$ is independently a group of formula (1); each $R^2$ is independently a substituted or unsubstituted monovalent hydrocarbon group of 1 to 20 carbon atoms; each $R^3$ is independently a group of the formula —OX, with X being a hydrogen atom or a group selected from among the options for $R^2$; each $R^1$ is independently a group selected from the options for $R^2$ or $R^3$; each q is independently an integer from 0 to 3 and each r is independently 0 or 1, such that q+r is 0 to 3 at each end, with the proviso that at least one end in formula (2) and formula (4) has $R^4$; n is an integer from 10 is to 2,000; and m is an integer from 1 to 10.

In this embodiment, component (A) may be at least one of the organopolysiloxanes of the following formulas

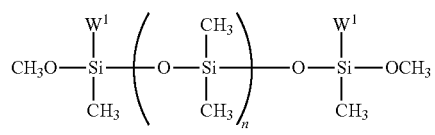

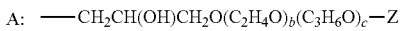

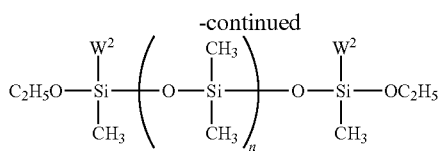

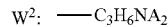

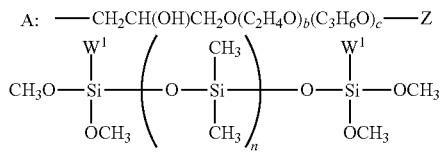

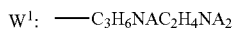

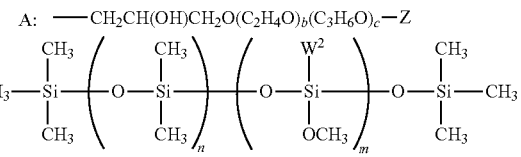

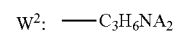

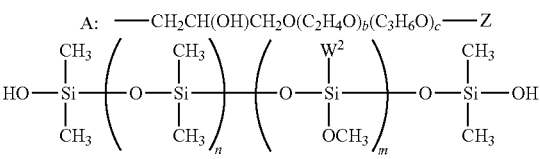

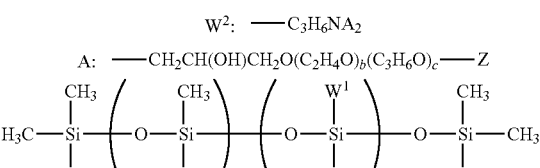

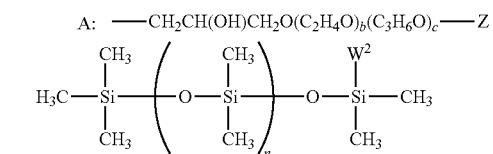

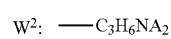

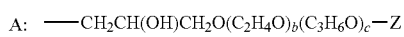

wherein n, m, b, c and Z are as defined above.

In another preferred embodiment, component (B) is a blocked polyisocyanate that includes a polyisocyanate compound consisting of aliphatic and/or alicyclic diisocyanate monomers. The polyisocyanate compound may have an isocyanurate structure.

The thermally labile blocking agent serving as component (B) may be at least one compound selected from the group consisting of oxime compounds, pyrazole compounds and active ethylene compounds.

The organopolysiloxane serving as component (A) may include groups selected from among hydroxyl, alkoxy, acyloxy and amino groups, at least one of the groups being in a reacted state with an isocyanate group on component (B).

The catalyst serving as component (C) may a compound containing at least one metal selected from the group consisting of zinc, titanium, iron, tin, lead, copper, bismuth, aluminum and zirconium.

In a second aspect, the invention provides a silicone emulsion composition containing the silicone composition of the first aspect of the invention.

In a third aspect, the invention provides a textile treatment containing the silicone composition of the first aspect of the invention or the silicone emulsion composition of the second aspect of the invention.

ADVANTAGEOUS EFFECTS OF THE INVENTION

The silicone composition of the invention has an excellent low-temperature curability. Textile treatments that make use of this invention impart textile fibers and products with good softness and water absorbency, and also have an excellent durability to washing.

DESCRIPTION OF THE PREFERRED EMBODIMENTS

The silicone composition of the invention includes (A) an organopolysiloxane, (B) a blocked polyisocyanate, and (C) a catalyst. These components are described in detail below.

(A) Organopolysiloxane

Component (A) is an organopolysiloxane having groups of general formula (1) below.

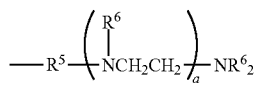
(1)

The organopolysiloxane has a viscosity at 25° C. of preferably from 50 to 50,000 mPa·s, more preferably 200 to 3,000 mPa·s, even more preferably 300 to 2,000 mPa·s, and most preferably 400 to 1,000 mPa·s. In this invention, the viscosity is a value measured at 25° C. with a Brookfield (BM-type) viscometer (Tokyo Keiki, Inc.).

The organopolysiloxane has a structure that may be linear, branched or cyclic, although a linear structure is preferred. In the organopolysiloxane, the groups of formula (1) are bonded to silicon atoms on the polysiloxane backbone, and may be present at the ends of the molecule and partway along the molecular chain. The organopolysiloxane has at least one, preferably two or more, and most preferably 2 to 10, groups of formula (1) per molecule.

In formula (1), $R^5$ is a divalent hydrocarbon group of 1 to 8 carbon atoms. Preferred examples of the divalent hydrocarbon group include alkylene groups such as methylene, ethylene, propylene and butylene groups. Of these, a propylene group is preferred. The letter "a" is an integer from 0 to 4, and is preferably 1 or 2. Each $R^6$ is independently a hydrogen atom, a monovalent hydrocarbon group or acyl group of 1 to 10 carbon atoms, or a polyoxyalkylene-containing organic group of the formula

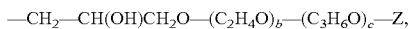

wherein Z is a hydrogen atom or a substituted or unsubstituted monovalent hydrocarbon group or acyl group of 1 to 20 carbon atoms, b is an integer from 2 to 30, c is an integer from 0 to 20, and the oxyethylene units and oxypropylene units may form a block polymer or may form a random polymer.

In the polyoxyalkylene-containing organic group, Z is a hydrogen atom or a substituted or unsubstituted monovalent hydrocarbon group or acyl group of 1 to 20, preferably 1 to 12, and more preferably 1 to 8 carbon atoms. The monovalent hydrocarbon group is exemplified by alkyl groups such as methyl, ethyl, propyl, butyl, pentyl, hexyl, heptyl, octyl, nonyl, decyl, dodecyl, tetradecyl, hexadecyl, octadecyl and eicosyl; cycloalkyl groups such as cyclopentyl and cyclohexyl; aryl groups such as phenyl and tolyl; alkenyl groups such as vinyl and allyl; and halogenated alkyl groups, halogenated alkenyl groups and the like obtained by substituting some or all of the hydrogen atoms bonded to carbon atoms in the foregoing groups with halogen atoms such as chlorine or fluorine. Examples of acyl groups include acetyl and benzoyl. Of these, Z is preferably a hydrogen atom, an alkyl group such as methyl, ethyl, propyl or butyl, or an acyl group such as acetyl or benzoyl, and is more preferably a methyl, butyl or acetyl group.

Component (A) is preferably at least one of the organopolysiloxanes of general formulas (2) to (4) below.

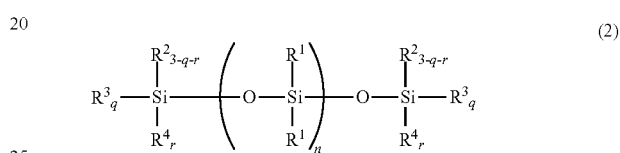

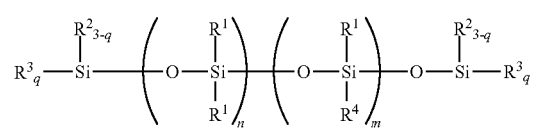

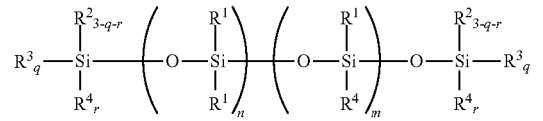

In general formulas (2) to (4), each $R^4$ is independently a group of formula (1).

Each $R^2$ in above formulas (2) to (4) is independently a substituted or unsubstituted monovalent hydrocarbon group of 1 to 20, preferably 1 to 12, and more preferably 1 to 8, carbon atoms. The monovalent hydrocarbon group is exemplified by alkyl groups such as methyl, ethyl, propyl, butyl, pentyl, hexyl, heptyl, octyl, nonyl, decyl, dodecyl, tetradecyl, hexadecyl, octadecyl and eicosyl; cycloalkyl groups such as cyclopentyl and cyclohexyl; aryl groups such as phenyl and tolyl; alkenyl groups such as vinyl and allyl; and halogenated alkyl groups, halogenated alkenyl groups and the like obtained by substituting some or all of the hydrogen atoms bonded to carbon atoms in the foregoing groups with halogen atoms such as chlorine or fluorine. Of these, methyl is industrially preferred.

In formulas (2) to (4), each $R^3$ is independently a group of the formula —OX, with X being a hydrogen atom or a group selected from the above options for $R^2$. X is preferably a hydrogen atom or an alkyl group such as methyl, ethyl, propyl, butyl, pentyl, hexyl, heptyl or octyl. Of these, $R^3$(—OX) is preferably a hydroxyl, methoxy or ethoxy group.

Each $R^1$ in formulas (2) to (4) is independently a group selected from the options for $R^2$ and $R^3$.

In formulas (2) to (4), each q is independently an integer from 0 to 3, each r is independently 0 or 1, and q+r at each end is from 0 to 3, provided that formula (2) and (4) have $R^4$ on at least one end. Formulas (2) to (4) preferably have at least one $R^3$ on the molecule. Also, q is preferably 1 or 2, and more preferably 1, with q being most preferably 1 at both ends. In formula (2), r is preferably 1 at both ends.

In formulas (2) to (4), n is an integer from 10 to 2,000, and preferably 20 to 1,000. When n is smaller than this lower limit, the textile softness or smoothness imparting effect is inadequate. On the other hand, when n is larger than this upper limit, the organopolysiloxane has a high viscosity, making it difficult to handle and emulsify, which is undesirable. Also, m is an integer from 1 to 10. When m is larger than this upper limit, yellowing tends to arise, which is undesirable.

Examples of the organopolysiloxanes of formulas (2) to (4) include the following.

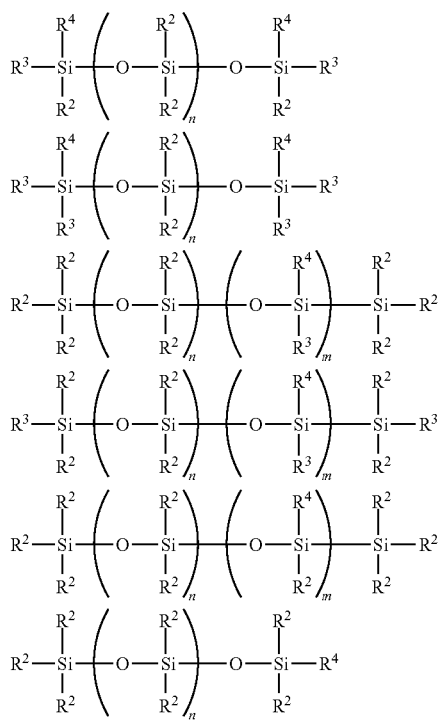

In these formulas, $R^2$, $R^3$, $R^4$, n and m are as defined above.

Of these, organopolysiloxanes of the following formula are especially preferred.

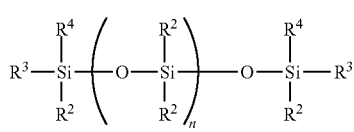

Here, $R^2$, $R^2$, $R^4$ and n are as defined above.

The amino group-containing organopolysiloxane of formula (2) can easily be obtained by a known synthesis process. For example, it can be obtained by a demethanolization reaction between a dimethylpolysiloxane capped at both ends with hydroxyl groups and 3-aminopropyldimethoxymethylsilane or N-(2-aminoethyl)-3-aminopropyldimethoxymethylsilane, either in the absence of a catalyst or in the presence of a catalyst such as an alkali metal hydroxide.

The amino group-containing organopolysiloxanes of formula (3) and (4) also can be easily obtained by a known synthesis process. For example, they can be obtained by an equilibration reaction between a cyclic siloxane such as octamethylcyclotetrasiloxane and 3-aminopropyldiethoxymethylsilane, N-(2-aminoethyl)-3-aminopropyldimethoxymethylsilane or a hydrolyzate of either, and also, as another starting material, a compound selected from among hexamethyldisiloxane and the like, in the presence of a catalyst such as an alkali metal hydroxide or tetramethylammonium hydroxide.

Of the amino group-containing organopolysiloxanes of formulas (2) to (4), organopolysiloxanes having a polyoxyalkylene-containing organic group can easily be obtained by a reaction between an organopolysiloxane of any of general formulas (5) to (7) below with a polyoxyalkylene monoglycidyl ether of general formula (8) below.

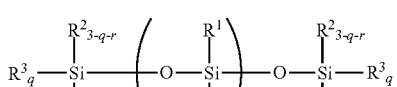

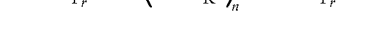

In formulas (5) to (7), $R^1$, $R^2$, $R^3$, n, m, q and r are as defined above, and Y is a group of the formula —$R^5$(NHCH$_2$CH$_2$)$_a$NH$_2$ (wherein $R^5$ and a are as defined above).

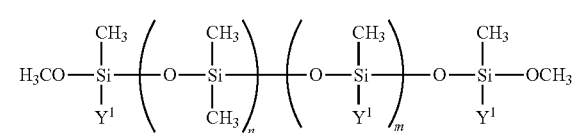

In formula (8), b, c and Z are as defined above.

Examples of the organopolysiloxanes of formula (5) to (7) include the following.

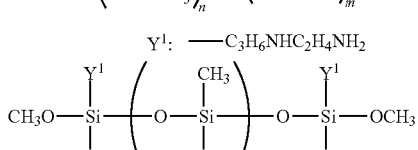

-continued

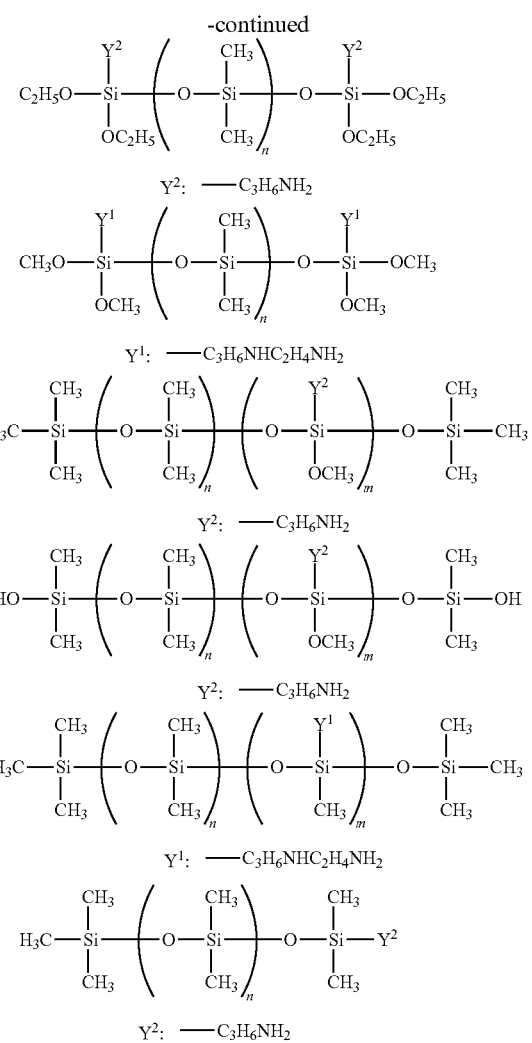

In these formulas, n and m are as defined above.

Examples of the polyoxyalkylene monoglycidyl ether of formula (8) include the following.

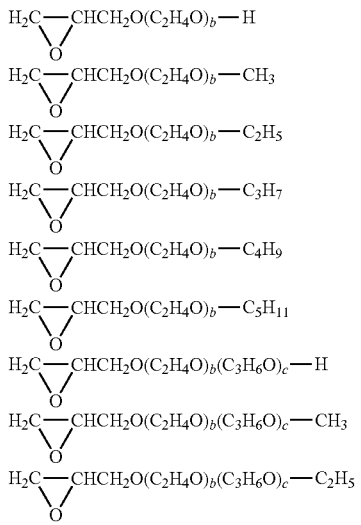

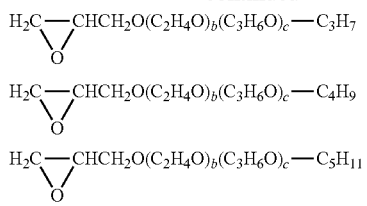

In these formulas, b and c are as defined above.

The reaction between an organopolysiloxane of formula (5) to (7) and a polyoxyalkylene monoglycidyl ether of formula (8) may be carried out in accordance with methods known to the art, and is not particularly limited. For example, the reaction may be carried out for 1 to 5 hours at 50 to 100° C., either in the absence of solvent or in the presence of a solvent such as a lower alcohol, toluene or xylene.

Examples of the organopolysiloxane obtained by reacting an organopolysiloxane of formulas (5) to (7) with a polyoxyalkylene monoglycidyl ether of formula (8) include the following.

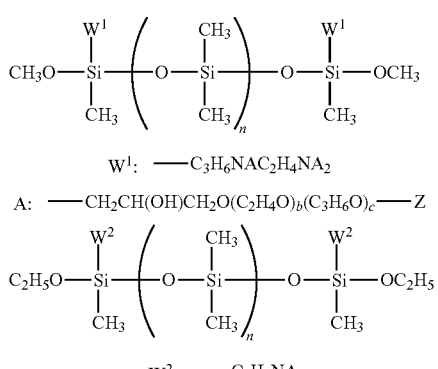

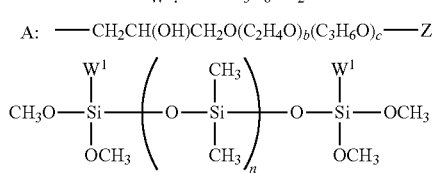

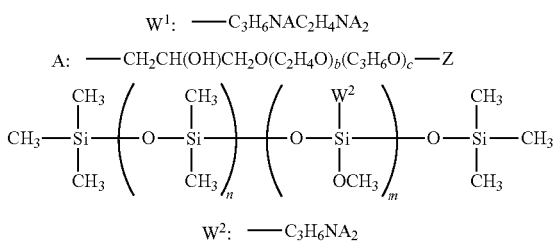

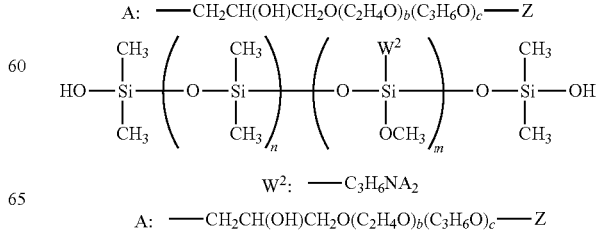

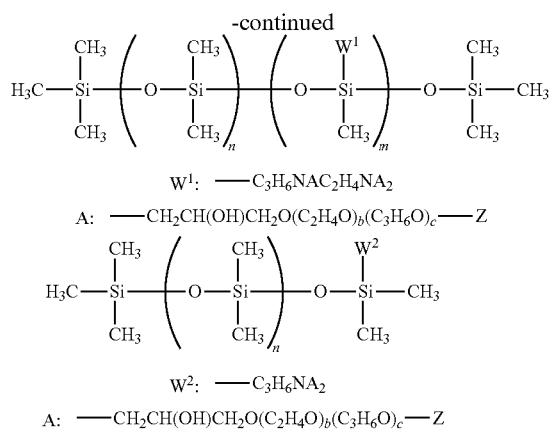

W$^1$: —C$_3$H$_6$NAC$_2$H$_4$NA$_2$

A: —CH$_2$CH(OH)CH$_2$O(C$_2$H$_4$O)$_b$(C$_3$H$_6$O)$_c$—Z

W$^2$: —C$_3$H$_6$NA$_2$

A: —CH$_2$CH(OH)CH$_2$O(C$_2$H$_4$O)$_b$(C$_3$H$_6$O)$_c$—Z

In these formulas, n, m, b, c and Z are as defined above.

Component (A) may have branches on the organopolysiloxane backbone. Examples of organopolysiloxanes having a branched structure include those of general formula (9) below.

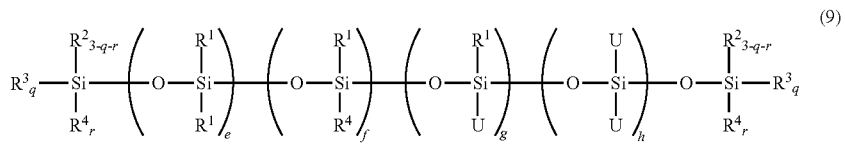

In formula (9), U is a group of general formula (10) below, and R$^1$, R$^2$, R$^3$, R$^4$, q and r in formulas (9) and (10) are as defined above. Also, e and i are each independently integers from 10 to 500, with e+i being from 10 to 2,000, and preferably 20 to 1,000; f and j are each independently integers from 0 to 20, with f+j being from 1 to 20, and preferably 2 to 10; g is an integer from 1 to 200; and h is an integer from 0 to 200.

$$U = -\left(O-\underset{R^1}{\underset{|}{\overset{|}{\overset{R^1}{Si}}}}-O\right)_i\left(O-\underset{R^4}{\underset{|}{\overset{|}{\overset{R^1}{Si}}}}-O\right)_j-O-\underset{R^4_r}{\underset{|}{\overset{|}{\overset{R^3_q}{Si}}}}-R^2_{3-q-r} \quad (10)$$

Two or more different organopolysiloxanes may be used together as component (A).

(B) Blocked Polyisocyanate

Component (B) is a blocked polyisocyanate having two or more isocyanate groups per molecule, at least 50 mol % of the isocyanate groups being blocked with a thermally labile blocking agent. Various known blocked polyisocyanates may be used as component (B). The blocked polyisocyanate can be prepared by reacting various known polyisocyanate compounds with various known blocking agents.

Examples of the polyisocyanate compound include various diisocyanates such as tolylene diisocyanate, diphenylmethane diisocyanate, m-xylylene diisocyanate, α,α,α',α'-tetramethyl-m-xylylene diisocyanate, tetramethylene-1,4-diisocyanate, pentamethylene-1,5-diisocyanate, hexamethylene diisocyanate, 2,2,4-trimethylhexamethylene-1,6-diisocyanate, lysine diisocyanate, isophorone diisocyanate, 1,3-bis(isocyanatomethyl)cyclohexane and 4,4-dicyclohexylmethane diisocyanate;

polyisocyanates obtained by reacting various diisocyanates such as those mentioned above with various polyols such as ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentanediol, 2-methyl-2,3-butanediol, 1,6-hexanediol, 1,2-hexanediol, 2,5-hexanediol, 2-methyl-2,4-pentanediol, 2,3-dimethyl-2,3-butanediol, 2-ethylhexanediol, 1,2-octanediol, 1,2-decanediol, 2,2,4-trimethylpentanediol, 2-butyl-2-ethyl-1,3-propanediol, 2,2-diethyl-1,3-propanediol, glycerol, trimethylolpropane, pentaerythritol, polyester polyols, polyether polyols, acrylic polyols or polyolefin polyols;

polyisocyanates which have a biuret structure and are obtained by reacting a polyisocyanate with water; and polyisocyanates which have an isocyanurate structure and are obtained by the cyclic trimerization of diisocyanates such as those mentioned above. Alternatively, use can be made of polyisocyanate compounds obtained by reacting various polyisocyanates such as those mentioned above with various polyols such as those mentioned above. Two or more of various types of polyisocyanate compounds such as those mentioned above may be used together.

Preferred polyisocyanate compounds include polyisocyanate compounds which have an isocyanurate structure and consist of aliphatic or alicyclic diisocyanates having 4 to 30 carbon atoms, such as tetramethylene-1,4-diisocyanate, pentamethylene-1,5-diisocyanate, hexamethylene diisocyanate, 2,2,4-trimethylhexamethylene-1,6-diisocyanate, lysine diisocyanate, isophorone diisocyanate, 1,3-bis(isocyanatomethyl)cyclohexane and 4,4-dicyclohexylmethane diisocyanate. In terms of weather resistance and ready availability, polyisocyanate compounds having an isocyanurate structure consisting of hexamethylene diisocyanate are especially preferred.

This polyisocyanate compound may also include at the same time, for example, biuret groups, urea groups, uretdione groups, urethane groups, allophanate groups, oxadiazinetrione groups or iminooxadiazinedione groups.

Blocking agents that can be used in the invention are compounds having one or more active hydrogen on the molecule. Exemplary blocking agents include alcohol, alkylphenol, phenol, active ethylene, mercaptan, acid amide, acid imide, imidazole, urea, oxime, amine, imine and pyrazole-type compounds.

Specific examples include alcohol compounds such as methanol, ethanol, 2-propanol, n-butanol, sec-butanol, 2-ethyl-1-hexanol, 2-methoxyethanol, 2-ethoxyethanol and 2-butoxyethanol; alkylphenol compounds which are mono- or dialkylphenols having as a substituent an alkyl group of at least 4 carbon atoms and phenol compounds, including monoalkylphenols such as n-propylphenol, isopropylphenol, n-butylphenol, sec-butylphenol, t-butylphenol, n-hexylphenol, 2-ethylhexylphenol, n-octylphenol and n-nonylphenol, dialkylphenols such as di-n-propylphenol, diisopropylphenol, n-propylcresol, isopropylcresol, di-n-butylphenol, di-t-butylphenol, di-sec-butylphenol, di-n-octylphenol, di-2-ethylhexylphenol and di-n-nonylphenol, and phenols such as phenol, cresol, ethyl phenol, styrenated phenol and hydroxybenzoic acid esters; active ethylene-type compounds such as dimethyl malonate, diethyl malonate, methyl acetoacetate, ethyl acetoacetate and acetyl acetone; mercaptan compounds such as butylmercaptan and dodecylmercaptan; acid amide compounds such as acetoanilide, acetic acid amide, ε-caprolactam, δ-valerolactam and γ-butyrolactam; acid imide compounds such as succinimide and maleimide; imidazole compounds such as imidazole and 2-methylimidazole; urea compounds such as urea, thiourea and ethyleneurea; oxime compounds such as formamide oxime, acetaldoxime, acetoxime, methyl ethyl ketone oxime and cyclohexanone oxime; amine compounds such as diphenylamine, aniline, carbazole, di-n-propylamine, diisopropylamine and isopropylethylamine; imine compounds such as ethylene imine and polyethyleneimine; and pyrazole compounds such as pyrazole, 3-methylpyrazole and 3,5-dimethylpyrazole.

Of these, active ethylene, oxime, and pyrazole-type compounds are preferred, with acetyl acetone, diethyl malonate, methyl ethyl ketone oxime, cyclohexanone oxime, 3-methylpyrazole and 3,5-dimethylpyrazole being especially preferred.

These blocking agents may be used singly or two or more may be used together.

Reaction of the polyisocyanate with the blocking agent may be carried out by a known method. Moreover, it can be carried out regardless of the presence of absence of a solvent. When a solvent is used, the solvent must be one that is inert to isocyanate groups. An organometallic salt or metal alcoholate, such as of tin, zinc or lead, and a tertiary amine or the like may be used as a catalyst during the blocking reaction. The blocking reaction can generally be carried out at between -20 and 150° C., and preferably between 0 and 100° C. At a temperature greater than 150° C., side effects may arise. On the other hand, when the temperature is too low, the reaction rate becomes low, which is disadvantageous. In this blocked polyisocyanate, at least 50 mol % of the isocyanate groups should be blocked, although it is preferable for at least 75 mol % to be blocked, and most preferable for at least 90 mol % to be blocked.

(C) Catalyst

Component (C) is a catalyst for promoting crosslinking reactions between components (A) and (B), and forming a cured film. The catalyst used as component (C) is not particularly limited, provided it is an organic base compound and/or a metal compound that functions as a catalyst for the reaction between components (A) and (B).

Examples of the organic base compound of component (C) include aliphatic amines such as ammonia, methylamine, ethylamine, dimethylamine and diethylamine; aromatic amines such as aniline, alkylanilines, haloanilines, haloalkylanilines, alkoxyanilines (methoxyaniline, ethoxyaniline, isopropoxyaniline) and benzylamines; heterocyclic amines such as pyrrole, imidazole, triazole, indole, pyridine, picoline, ethylmethylpyridine, aminopyridine, aminotriazole, aminoimidazole, aminothiophene, aminothiazole, aminofuran, aminobenzimidazole, quinoline, diazabicycloundecene and diazabicyclononene; and aminosilanes such as (aminopropyl)trimethoxysilane, (aminopropyl)triethoxysilane, N-(aminoethyl)aminopropyltrimethoxysilane, N-(aminoethyl)aminopropyltriethoxysilane, aminopropyltrimethylsilane, N-trimethylsilylacetamide, N-trimethylsilylformamide, N,N'-dimethyl-N,N'-bis-(trimethylsilyl)urea, dimethyltrimethylsilylamine, hexamethyldisilazane and divinyltetramethyldisilazane.

The metal compound of component (C) is not particularly limited in the type of metal, although it is preferably a compound that includes at least one metal selected from among zinc, titanium, iron, tin, lead, bismuth, aluminum and zirconium. The metal compound is a salt and/or complex in which an ion of this metal serves as the central element and which preferably has at least one type of counterion and/or ligand selected from among carboxylic acids, ketones and esters having an alkyl group of 1 to 30 carbon atoms. Examples of the alkyl groups include methyl, isopropyl, butyl, 2-ethylhexyl, octyl, isodecyl, isostearyl, decanyl and cetyl groups.

Illustrative examples of the metal compound include metal carboxylates such as tin bis(2-ethylhexanoate), zinc bis(2-ethylhexanoate), iron bis(2-ethylhexanoate), iron tris(2-ethylhexanoate), zirconium bis(2-ethylhexanoate), zirconium tetra(2-ethylhexanoate), bismuth tris(2-ethylhexanoate) and tin versatate; tetravalent organotin compounds such as dibutyltin dilaurate, dibutyltin maleate, dibutyltin phthalate, dibutyltin dioctanoate, dibutyltin bis(2-ethylhexanoate), dibutyltin bis(methyl maleate), dibutyltin bis(ethyl maleate), dibutyltin bis(butyl maleate), dibutyltin bis(octyl maleate), dibutyltin bis(tridecyl maleate), dibutyltin bis(benzyl maleate), dibutyltin diacetate, dioctyltin bis(ethyl maleate), dioctyltin bis(octyl maleate), dibutyltin dimethoxide, dibutyltin bis(nonyl phenoxide), dibutenyltin oxide, dibutyltin bis(acetyl acetonate), dibutyltin bis(ethyl acetoacetate), the reaction products of dibutyltin oxide with silicate compounds, the reaction products of dialkyltin dicarboxylates such as dibutyltin dilaurate with silicate compounds, and the reaction products of dibutyltin oxide with phthalic acid esters; organotitanates such as tetraisopropoxytitanium, tetra-n-butoxytitanium, dipropoxy bis(triethanolaminate)titanium, diisopropoxy bis(triethanolaminate)titanium, diisopropoxy bis(acetylacetonate)titanium and diisopropoxy bis(ethyl acetoacetate)titanium; and organoaluminum compounds such as aluminum tris(acetylacetonate), aluminum tris(ethyl acetoacetate) and diisopropoxyaluminum ethyl acetoacetate; and zirconium compounds such as zirconium tetrakis(acetyl acetonate).

Examples of commercial products include Nacem Aluminum, Nacem Copper, Nacem Ferric Iron, Nacem Zinc, Nacem Zirconium, Nacem Titanium, the Naftex Zinc series, the Nikka Octhix Zinc series, the Nikka Octhix Bismuth series, the Bismuth Neodecanoate series, the Naftex Zirconium series, the Nikka Octhix Zirconium series, the Naftex Iron series, the Nikka Octhix Iron series and the Naftex Copper series (all available under these product names from Nihon Kagaku Sangyo Co., Ltd.); Orgatix ZA-40, Orgatix ZA-65, Orgatix ZC-150, Orgatix ZC-540, Orgatix ZC-570, Orgatix ZC-580, Orgatix ZC-700, Orgatix ZB-320, Orgatix TA-10, Orgatix TA-25, Orgatix TA-22, Orgatix TA-30, Orgatix TC-100, Orgatix TC-401, Orgatix TC-200, Orgatix TC-750 and Orgatix TPHS (all available under these product names from Matsumoto Fine Chemical Co, Ltd.); Neostann U-28, Neostann U-50, Neostann U-100, Neostann U-810, Neostann U-820, Neostann U-600 and Neostann U-660 (all available under these product names from Nitto Kasei Co, Ltd.); Aluminum Ethoxide, AIPD, PADM, AMD, ASBD, ALCH, ALCH-TR, Aluminum Chelate M, Aluminum Chelate D, Aluminum Chelate A, Algomaer, Alugomaer 800AF, Alugomaer 1000SF and Plenact ALM (all available under these product names from Kawaken Fine Chemicals Co, Ltd.); and the Octope series, Chelope series, Oliope series, Acetope series and Chemihope series (all available under these product names from Hope Chemical Co, Ltd.).

Component (C) may use two or more of the above catalysts at the same time.

The catalyst serving as component (C) promotes reactions between NH groups and/or hydroxyl groups on the organopolysiloxane of component (A) and isocyanate groups on component (B), and can thereby increase the low-temperature curability.

Moreover, when a substrate is treated with the inventive composition, the catalyst promotes reactions between isocyanate groups on component (B) and reactive groups contained in the substrate, making it possible to increase the amount of composition that adheres to the substrate. For example, when a textile product is treated with the composition, the catalyst promotes reactions between hydroxyl groups in the fiber components and isocyanate groups on component (B), enabling the silicone composition to adhere more strongly to the fibers. In the prior art, the need for high-temperature treatment when applying a binder onto fibers has been a problem. Because the silicone composition of the invention has a high curability even under low-temperature treatment conditions, this problem can be resolved.

The silicone composition of the invention includes, per 100 parts by weight of components (A) and (B) combined: (A) 70 to 98 parts by weight of the organopolysiloxane, (B) 2 to 30 parts by weight of the blocked polyisocyanate, and (C) 0.01 to 10 parts by weight of the catalyst. The composition preferably includes, per 100 parts by weight of components (A) and (B) combined: (A) 80 to 95 parts by weight of the organopolysiloxane, (B) 5 to 20 parts by weight of the blocked polyisocyanate, and (C) 0.1 to 5 parts by weight of the catalyst. When there is too much component (A) and too little component (B) and component (C), the curability is low and the wash durability of the composition when used as a textile treatment is inadequate. On the other hand, when there is too little component (A) and too much component (B) and component (C), the storage stability is inadequate.

The silicone composition of the invention may optionally include various types of solvents, so long as the objects of the invention can be attained. Examples of such solvents include acetone, methyl ethyl ketone, methyl isobutyl ketone, ethyl acetate, n-butyl acetate, cellosolve acetate, butanol, isopropyl alcohol, toluene and dipropylene glycol monomethyl ether. These solvents may be used singly or two or more may be used together.

The silicone composition of the invention can be prepared by uniformly mixing together components (A), (B) and (C) and also, optionally, various solvents. Preferably, at least one hydroxyl, alkoxy, acyloxy or amino group included,in component (A) reacts with an isocyanate group on component (B). In this case, the alkoxy group or acyloxy group is converted to a hydroxyl group and reacts with the isocyanate group. The reaction method is not particularly limited, and reaction may be carried out according to a method known to the art, such as heating during mixture. The temperature at the time of the reaction is not particularly limited, but is preferably from 0 to 200° C., and more preferably from 50 to 150° C.

The curable silicone composition of the invention has an excellent low-temperature curability, can impart a good softness to various types of textile fibers and products and moreover has an excellent durability to washing, thus making it useful as a textile treatment. In addition to being effective on natural fibers such as cotton, silk, linen, wool, angora and mohair, this composition is also effective on synthetic fibers such as polyester, nylon, acrylics and spandex, and also on all textile products made with such fibers. Nor are there any limitations on the form and shape of such textile fibers and products, the inventive textile treatment being suitable for use not only on raw materials such as staple fiber, filament, tow and yarn, but also on various processed forms such as knit fabric, woven fabric, batting, nonwovens, blended yarn, paper, sheet and film.

When using the silicone composition of the invention as a textile treatment, it is either dissolved in an organic solvent such as toluene, xylene, n-hexane, n-heptane, methyl ethyl ketone, methyl isobutyl ketone, ethyl acetate, butyl acetate or mineral turpentine and used in this manner to treat textile fibers and products, or it is emulsified in an aqueous medium using a nonionic, anionic or cationic surfactant and used in this state to treat textile fibers and products. These emulsifying agents are not particularly limited, and may be selected from among nonionic emulsifying agents such as polyoxyethylene alkyl ethers, polyoxyethylene alkyl phenyl ethers, sorbitol alkylates and polyoxyethylene sorbitol alkylates; anionic emulsifying agents such as alkylbenzene sulfonates and alkyl phosphates; cationic emulsifying agents such as quaternary ammonium salts and alkylamine salts; and amphoteric emulsifying agents such as alkyl betaines and alkyl imidazolines. These emulsifying agents are used in an amount, per 100 parts by weight of the organopolysiloxane, of preferably 5 to 50 parts by weight, and more preferably 10 to 30 parts by weight. Water may be used in any amount during emulsification, although use is typically made of an amount such as to set the concentration of organopolysiloxane, expressed in terms of the pure compound, to generally 5 to 60 wt %, and preferably 10 to 40 wt %.

An emulsion of the inventive textile treatment may be formed by mixing together the organopolysiloxane of the invention and a surfactant, then using an emulsifier such as a homogenizing mixer, homogenizer, colloid mill or line mixer to carry out emulsification.

When using the textile treatment of the invention to treat various types of textile fibers and products, a solution or emulsion of the composition in an organic solvent is prepared to the desired concentration, then is applied to the fibers by such means as dipping, spraying or roll coating. The pickup differs with the type of fiber and is not particularly limited, but is generally set to an amount, expressed in terms of the pure organopolysiloxane with respect to the fabric, in the range of 0.01 to 10 wt %. The fabric is then dried by hot air blowing, heat treatment or the like. Although the conditions vary with the type of fiber, when treatment by dipping is carried out, the dipping time may be set to 1 to 5 minutes, and the drying temperature and time may be set in the respective ranges of 100 to 200° C. and 1 to 15 minutes.

Aside from textile treatment applications, the curable silicone composition of the invention may also be used in various other applications such as coatings, adhesives, sealants, inks, and impregnating agents and surface treatments for paper and the like. Where necessary, additives may be used at this time. Exemplary additives include textile chemicals such as anti-creasing agents, flame retardants, antistatic agents and heat stabilizers; and also antioxidants, ultraviolet absorbers, pigments, metal flake pigments, rheology control agents, curing accelerators, deodorants and antimicrobial agents. These additives may be used singly or two or more may be used together.

EXAMPLES

Synthesis Examples, Working Examples of the invention and Comparative Examples are given below by way of illustration and not by way of limitation. In these Examples, all parts are indicated by weight.

In the following Examples, the number-average molecular weights are polystyrene-equivalent number-average molecular weights measured by gel permeation chromatography (GPC) using the following apparatus.

Instrument: HLC-802A, from Tosoh Corporation
Columns: (from Tosoh Corporation)
G1000HXL column (1)
G2000HXL column (1)
G3000HXL column (1)
Carrier: Tetrahydrofuran
Method of detection: Differential refractometer The viscosities were values measured at 25° C. using a Brookfield (BM-type) viscometer (from Tokyo Keiki, Inc.). $^1$H-NMR measurements were taken in heavy chloroform using a 400 MHz FT-NMR spectrometer (JEOL Ltd.).

Synthesis Example 1

A separable flask equipped with a thermometer, a stirrer, a reflux condenser and a nitrogen gas inlet was charged with 100 g of aminoalkyl group-containing organopolysiloxane of formula (A) below (molecular weight, 4,066; amine equivalent weight, 1,010 g/mol), the polyethylene glycol monobutyl monoglycidyl ether shown in formula (B) below (molecular weight, 349) in an amount of 52 g (this being the amount such that the ratio of the number of glycidyl groups on the polyethylene glycol monobutyl monoglycidyl ether to the total number of nitrogen-bonded hydrogen atoms (—NH) on the aminoalkyl group-containing organopolysiloxane becomes 1.0), and 7.4 g of isopropyl alcohol. Nitrogen gas was introduced into the system, after which the system was tightly sealed and an addition reaction was carried out for 4 hours at 80° C. Following reaction completion, removal of the low-boiling fraction was carried out for 1 hour at 80° C. and under a reduced pressure of 10 mmHg, yielding 145 g of the oily compound shown in formula (C) below. The compound had an appearance that was light-yellow and translucent, a viscosity of 490 mPa·s, and an amine equivalent weight of 2,940 g/mol. Upon $^1$H-NMR measurement of the compound, the ratio between methylene groups directly bonded to silicon atoms on the organopolysiloxane and terminal methyl groups on the butyl group of the polyethylene glycol monobutyl monoglycidyl ether that reacted with nitrogen atoms on the aminoalkyl group-containing organopolysiloxane was found to be 1:3.01, confirming that all the nitrogen atoms on the aminoalkyl group-containing organopolysiloxane had reacted with glycidyl groups on the polyethylene glycol monobutyl monoglycidyl ether. Unreacted glycidyl groups were not detected.

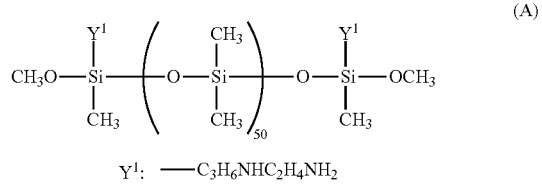

(A)

$Y^1$: —$C_3H_6NHC_2H_4NH_2$

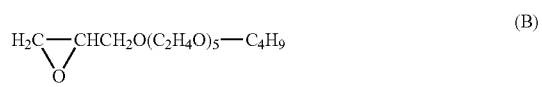

(B)

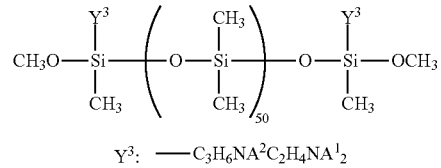

(C)

$Y^3$: —$C_3H_6NA^2C_2H_4NA^1_2$ $A^1$: —$CH_2CH(OH)CH_2O(C_2H_4O)_5$—$C_4H_9$

Synthesis Example 2

The interior of a separable flask fitted with a stirrer, a thermometer, a reflux condenser, a nitrogen blowing tube and a dropping funnel was placed under a nitrogen atmosphere, charged with 600 parts of hexamethylene diisocyanate, and the temperature within the reactor was held at 70° C. under stirring. The isocyanurate-forming catalyst tetramethylammonium caprate was added and, when the rate of conversion reached 40%, the reaction was stepped by adding phosphoric acid. The reaction mixture was filtered, following which unreacted hexamethylene diisocyanate was removed using a thin-film evaporator. The resulting polyisocyanate had a viscosity at 25° C. of 2,500 mPa·s and a number-average molecular weight of 680.

The rate of conversion for isocyanurate formation was obtained by determining the surface area of the peak at the molecular weight corresponding to the isocyanurate as a proportion of the sum of the surface area of the peak at the molecular weight corresponding to the unreacted hexamethylene diisocyanate and the surface area of the peak at the molecular weight corresponding to the isocyanurate.

Synthesis Example 3

A reactor like that in Synthesis Example 2 was charged with 100 parts of the isocyanurate obtained in Synthesis Example 2, 13 parts of polypropylene diol, and butyl acetate as the solvent in an amount such that the final blocked polyisocyanate ingredient concentration becomes 90 wt %, and the system was held under a nitrogen atmosphere for 3 hours at 70° C. Next, 50 parts of 3,5-dimethylpyrazole was added, and the characteristic absorption of isocyanate groups in the infrared spectrum was confirmed to have vanished. The resulting blocked polyisocyanate had an average molecular weight of 1,200.

Example 1

A separable flask equipped with a thermometer, a stirrer, a reflux condenser and a nitrogen gas inlet was charged with 87.5 parts of the organopolysiloxane of formula (A) above and 12.5 parts of the blocked polyisocyanate obtained in Synthesis Example 3, the flask was flushed with nitrogen, and the flask contents were stirred for 4 hours at 120° C. Next, after cooling to room temperature, 1 part of zinc bis(2-ethylhexanoate) was added and the system was stirred for 10 minutes, giving a silicone composition.

Example 2

Aside from replacing the organopolysiloxane of formula (A) with the organopolysiloxane obtained in Synthesis Example 1, a silicone composition was prepared in the same way as in Example 1.

Example 3

Aside from replacing the zinc bis(2-ethylhexanoate) with iron tris(2-ethylhexanoate), a silicone composition was prepared in the same way as in Example 2.

Example 4

Aside from replacing the zinc bis(2-ethylhexanoate) with dioctyltin dilaurate, a silicone composition was prepared in the same way as in Example 2.

Example 5

Aside from replacing the zinc bis(2-ethylhexanoate) with dipropoxy bis(triethanolaminate)titanium, a silicone composition was prepared in the same way as in Example 2.

Example 6

Aside from replacing the zinc bis(2-ethylhexanoate) with diazabicycloundecene, a silicone composition was prepared in the same way as in Example 2.

Example 7

Aside from replacing the zinc bis(2-ethylhexanoate) with N-2-(aminoethyl)-3-aminopropyolmethyldimethoxysilane, a silicone composition was prepared in the same way as in Example 2.

Comparative Example 1

A separable flask equipped with a thermometer, a stirrer, a reflux condenser and a nitrogen gas inlet was charged with 87.5 parts of the organopolysiloxane obtained in Synthesis Example 1 and 12.5 parts of the blocked polyisocyanate obtained in Synthesis Example 3, and the flask contents were stirred under a nitrogen atmosphere for 4 hours at 120° C., giving a silicone composition.

Comparative Example 2

Aside from changing the amount of zinc bis(2-ethylhexanoate) from 1 part to 0.005 part, a silicone composition was prepared in the same way as in Example 2.

Comparative Example 3

Aside from changing the amount of zinc bis(2-ethylhexanoate) from 1 part to 20 parts, a silicone composition was prepared in the same way as in Example 2.

[Evaluation Tests]
1. Curability

Two grams of the silicone composition obtained as described above was weighed into an aluminum laboratory dish having a 6 cm diameter and heated at 130° C. for 10 minutes. Compositions that cured completely were given a rating of "A"; compositions that only partially cured were given a rating of "B"; compositions that remained entirely uncured were given a rating of "C". The results are shown in Table 1.

2. Storage Stability

Five grams of the silicone composition was placed in a 25 mL glass bottle and left to stand for one day at 40° C., following which the appearance was examined. Compositions having a good appearance were rated as "Good"; compositions that had thickened or gelled were rated as "NG". The results are shown in Table 1.

TABLE 1

| | Curability | Storage stability |
|---|---|---|
| Example 1 | A | good |
| Example 2 | A | good |
| Example 3 | A | good |
| Example 4 | A | good |
| Example 5 | A | good |
| Example 6 | A | good |
| Example 7 | A | good |
| Comparative Example 1 | C | good |
| Comparative Example 2 | B | good |
| Comparative Example 3 | A | NG |

Example 8

Using a homogenizing mixer, 60 g of the silicone composition obtained in Example 1 and 10 g of polyoxyethylene alkyl ether (Emulgen 1108, from Kao Corporation) were mixed together for 20 minutes at 2,000 rpm, and emulsified and dispersed in 20 g of water. The dispersion was then diluted with 110 g of water, giving an emulsion composition.

Example 9

Aside from replacing the silicone composition obtained in Example 1 with the silicone composition obtained in Example 2, an emulsion composition was formulated and prepared in the same way as in Example 8.

Example 10

Aside from replacing the silicone composition obtained in Example 1 with the silicone composition obtained in Example 3, an emulsion composition was formulated and prepared in the same way as in Example 8.

Example 11

Aside from replacing the silicone composition obtained in Example 1 with the silicone composition obtained in Example 4, an emulsion composition was formulated and prepared in the same way as in Example 8.

Example 12

Aside from replacing the silicone composition obtained in Example 1 with the silicone composition obtained in
Example 5, an emulsion composition was formulated and prepared in the same way as in Example 8.

Example 13

Aside from replacing the silicone composition obtained in Example 1 with the silicone composition obtained in Example 6, an emulsion composition was formulated and prepared in the same way as in Example 8.

Example 14

Aside from replacing the silicone composition obtained in Example 1 with the silicone composition obtained in Example 7, an emulsion composition was formulated and prepared in the same way as in Example 8.

Comparative Example 4

Aside from replacing the silicone composition obtained in Example 1 with the silicone composition obtained in Comparative Example 1, an emulsion composition was formulated and prepared in the same way as in Example 8.

Comparative Example 5

Aside from replacing the silicone composition obtained in Example 1 with the silicone composition obtained in Comparative Example 2, an emulsion composition was formulated and prepared in the same way as in Example 8.

Comparative Example 6

Aside from replacing the silicone composition obtained in Example 1 with the silicone composition obtained in Comparative Example 3, an emulsion composition was formulated and prepared in the same way as in Example 8.

[Evaluation Tests]

The following evaluation tests were carried out on each of the emulsion compositions. The results are shown in Table 2.

3. Softness

A test liquid was prepared by adding deionized water to the emulsion composition obtained above and diluting to a solids concentration of 0.5 wt %. A polyester/cotton broadcloth (65%/35%, from Tanigashira Shoten) was dipped for 1 minute in the test liquid, after which the cloth was squeezed using rolls at a squeezing ratio of 100%, dried for 2 minutes at 100° C., and then additionally heat treated for 2 minutes at 150° C., thereby producing a treated cloth for softness evaluation. A panel of three judges tested the treated cloth by touching it with their hands and rated the softness according to the following criteria.

A: Very pleasant to the touch
B: Pleasant to the touch
C: Unpleasant to the touch 4. Water Absorbency A test liquid was prepared by adding deionized water to the emulsion composition obtained above and diluting to a solids concentration of 2 wt %. A polyester/cotton broadcloth (65%/35%, from Tanigashira Shoten) was dipped for 10 seconds in the test liquid, after which the cloth was squeezed using rolls at a squeezing ratio of 100% and dried for 2 minutes at 130° C. A single drop (25 μL) of tap water was deposited with a dropping pipette on the treated cloth, and the time in seconds until the drop was completely absorbed by the cloth was measured.

5. Wash Durability

A test liquid was prepared by adding deionized water to the emulsion composition obtained above and diluting to a solids concentration of 2 wt %. A polyester/cotton broadcloth (65%/35%, from Tanigashira Shoten) was dipped for 10 seconds in the test liquid, after which the cloth was squeezed using rolls at a squeezing ratio of 100% and dried for 2 minutes at 130° C. The treated cloth was then washed a single time with a washing machine by a procedure in accordance with JIS L0217 103. The amount of silicone remaining on the fiber surfaces after a single wash was measured with a fluorescence x-ray spectrometer (Rigaku Corporation) and calculated as the remaining ratio (%) compared with when washing was not carried out.

TABLE 2

|  | Softness | Water absorbency (seconds) | Wash durability (%) |
|---|---|---|---|
| Example 8 | A | 7 | 80 |
| Example 9 | A | 6 | 71 |
| Example 10 | A | 6 | 65 |
| Example 11 | A | 8 | 76 |
| Example 12 | A | 7 | 72 |
| Example 13 | A | 5 | 68 |
| Example 14 | A | 5 | 65 |
| Comparative Example 4 | A | 9 | 5 |
| Comparative Example 5 | A | 7 | 11 |
| Comparative Example 6 | A | 11 | 82 |
| Untreated cloth | C | 15 |  |

As shown in Table 1, the silicone compositions of the invention have an excellent low-temperature curability. Also, as shown in Table 2, textile treatments using silicone compositions according to the invention are able to impart good softness and water absorbency to textiles, and also have an excellent wash durability.

The silicone compositions of the invention have an excellent low-temperature curability. When used in textile treatments, they can impart textiles with good softness. In addition, they have an excellent wash durability, and can be used as high-durability binder resins.

Japanese Patent Application No. 2015-100789 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A blocked polyisocyanate-containing curable silicone composition comprising:
    (A) 70 to 98 parts by weight of an organopolysiloxane having a terminal or pendant group of general formula (1) below

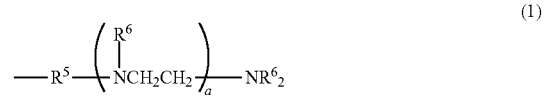

wherein $R^5$ is a divalent hydrocarbon group of 1 to 8 carbon atoms, the letter "a" is an integer from 0 to 4, and each $R^6$ is independently a hydrogen atom, a monovalent hydrocarbon group or acyl group of 1 to 10 carbon atoms, or a polyoxyalkylene-containing organic group of the formula

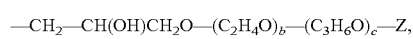

wherein Z is a hydrogen atom, a substituted or unsubstituted monovalent hydrocarbon group or acyl group of 1 to 20 carbon atoms, b is an integer from 2 to 30, c is an integer from 0 to 20, and the oxyethylene units and oxypropylene units may form a block polymer or may form a random polymer;
    (B) 2 to 30 parts by weight of a blocked polyisocyanate which has at least two isocyanate groups per molecule, at least 50 mol % of the isocyanate groups being blocked with a thermally labile blocking agent, with the proviso that the combined amount of components (A) and (B) is 100 parts by weight; and (C) 0.01 to 10 parts by weight of a catalyst which is an organic base compound or a metal compound or both;

wherein component (A) is at least one of the organopolysiloxanes of the following formulas

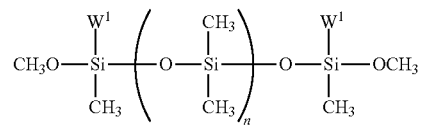

W$^1$:   —C$_3$H$_6$NAC$_2$H$_4$NA$_2$

A:   —CH$_2$CH(OH)CH$_2$O(C$_2$H$_4$O)$_b$(C$_3$H$_6$O)$_c$—Z

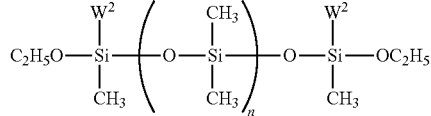

W$^2$:   —C$_3$H$_6$NA$_2$

A:   —CH$_2$CH(OH)CH$_2$O(C$_2$H$_4$O)$_b$(C$_3$H$_6$O)$_c$—Z

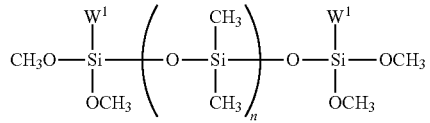

W$^1$:   —C$_3$H$_6$NAC$_2$H$_4$NA$_2$

A:   —CH$_2$CH(OH)CH$_2$O(C$_2$H$_4$O)$_b$(C$_3$H$_6$O)$_c$—Z

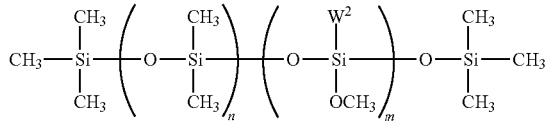

W$^2$:   —C$_3$H$_6$NA$_2$

A:   —CH$_2$CH(OH)CH$_2$O(C$_2$H$_4$O)$_b$(C$_3$H$_6$O)$_c$—Z

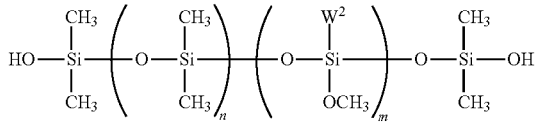

W$^2$:   —C$_3$H$_6$NA$_2$

A:   —CH$_2$CH(OH)CH$_2$O(C$_2$H$_4$O)$_b$(C$_3$H$_6$O)$_c$—Z

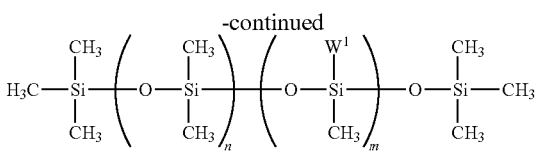

W$^1$:   —C$_3$H$_6$NAC$_2$H$_4$NA$_2$

A:   —CH$_2$CH(OH)CH$_2$O(C$_2$H$_4$O)$_b$(C$_3$H$_6$O)$_c$—Z

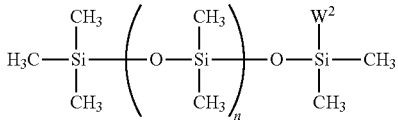

W$^2$:   —C$_3$H$_6$NA$_2$

A:   —CH$_2$CH(OH)CH$_2$O(C$_2$H$_4$O)$_b$(C$_3$H$_6$O)$_c$—Z wherein n is an integer from 10 to 2,000; m is an integer from 1 to 10; and b, c and Z are as defined above.

2. The silicone composition of claim 1, wherein component (B) is a blocked polyisocyanate that includes a polyisocyanate compound consisting of aliphatic and/or alicyclic diisocyanate monomers.

3. The silicone composition of claim 2, wherein the polyisocyanate compound has an isocyanurate structure.

4. The silicone composition of claim 1, wherein the thermally labile blocking agent serving as component (B) is at least one compound selected from the group consisting of oxime compounds, pyrazole compounds and active ethylene compounds.

5. The silicone composition of claim 1, wherein the organopolysiloxane serving as component (A) includes groups selected from among hydroxyl, alkoxy, acyloxy and amino groups, at least one of the groups being in a reacted state with an isocyanate group on component (B).

6. The silicone composition of claim 1, wherein the catalyst serving as component (C) is a compound containing at least one metal selected from the group consisting of zinc, titanium, iron, tin, lead, copper, bismuth, aluminum and zirconium.

7. A silicone emulsion composition containing the silicone composition of claim 1.

8. A textile treatment containing the composition of claim 1.

* * * * *